US009952603B2

(12) United States Patent
Ramirez

(10) Patent No.: US 9,952,603 B2
(45) Date of Patent: Apr. 24, 2018

(54) SYSTEM AND METHOD FOR ENHANCING THE PRODUCTION LEVEL OF WELLS

(71) Applicant: SITEPP Sistemas y Tecnologia para el Petróleo, S.A. de C.V., Boca del Rio, Veracruz (MX)

(72) Inventor: Francisco Morales Ramirez, Veracruz (MX)

(73) Assignee: SITEPP SISTEMAS Y TECHNOLOGIA PARA EL PETROLEO, S.A. DE C.V., Vera Cruz (MX)

( * ) Notice: Subject to any disclaimer, the term of this patent is extended or adjusted under 35 U.S.C. 154(b) by 833 days.

(21) Appl. No.: 14/317,216

(22) Filed: Jun. 27, 2014

(65) Prior Publication Data
US 2015/0000753 A1    Jan. 1, 2015

Related U.S. Application Data

(60) Provisional application No. 61/840,661, filed on Jun. 28, 2013.

(51) Int. Cl.
*G05D 7/06* (2006.01)
*F17D 1/00* (2006.01)

(52) U.S. Cl.
CPC ............. *G05D 7/0652* (2013.01); *F17D 1/00* (2013.01); *Y10T 137/0324* (2015.04);
(Continued)

(58) Field of Classification Search
CPC ... G05D 7/0652; F17D 1/00; Y10T 137/0324; Y10T 137/0379; Y10T 137/87249; Y10T 137/85986; Y10T 137/86002
(Continued)

(56) References Cited

U.S. PATENT DOCUMENTS

| 4,616,700 A | 10/1986 | Wood et al. |
| 2004/0007392 A1* | 1/2004 | Judge ............... E21B 21/001 175/206 |

(Continued)

FOREIGN PATENT DOCUMENTS

WO    2007116008 A1    10/2007

OTHER PUBLICATIONS

International Search Report dated Jan. 22, 2015 issued in connection with corresponding PCT Patent Application No. PCT/IB2014/02028.

*Primary Examiner* — Kenneth M Lo
*Assistant Examiner* — Alan Chu
(74) *Attorney, Agent, or Firm* — Grogan, Tuccillo & Vanderleeden, LLP

(57) ABSTRACT

A control system for optimizing the flow of fluid from a plurality of pipelines in communication with a resource field includes a sensor array detecting characteristics of the resource field, the plurality of pipelines, and the flow of fluid through the plurality of pipelines. A first manifold assembly and a second manifold assembly each selectively receives the flow of fluid from any of the plurality of pipelines. A controller is provided to be in communication with the sensor array, the first manifold assembly and the second manifold assembly. The controller selectively diverts the flow of the fluid from a first group of the plurality of pipelines to one of the first and the second manifold assemblies, and diverts a second group of the plurality of pipelines to another of the first and the second manifold assemblies, in dependence upon the characteristics being communicated to the controller.

17 Claims, 4 Drawing Sheets

(52) U.S. Cl.
CPC .. *Y10T 137/0379* (2015.04); *Y10T 137/85986* (2015.04); *Y10T 137/86002* (2015.04); *Y10T 137/87249* (2015.04)

(58) Field of Classification Search
USPC ........................................................ 700/282
See application file for complete search history.

(56) References Cited

U.S. PATENT DOCUMENTS

| | | | |
|---|---|---|---|
| 2005/0199287 A1* | 9/2005 | Shajii | G05D 16/2053 137/487.5 |
| 2005/0236155 A1* | 10/2005 | Killie | E21B 33/0355 166/369 |
| 2007/0201305 A1* | 8/2007 | Heilman | E21B 21/062 366/141 |
| 2012/0085276 A1* | 4/2012 | Openshaw | E21B 43/0122 114/257 |

* cited by examiner

SYSTEM AND METHOD FOR ENHANCING THE PRODUCTION LEVEL OF WELLS

CROSS REFERENCE TO RELATED APPLICATION

This application claims the benefit of U.S. Provisional Application Ser. No. 61/840,661, filed on Jun. 28, 2013, which is hereby incorporated by reference in its entirety.

FIELD OF THE INVENTION

The present invention relates generally to the efficient production of resource fields and, more particularly, to a system and method for enhancing the production level of oil and natural gas wells.

BACKGROUND OF THE INVENTION

In oil and gas fields, the extraction of hydrocarbon fluids, such as oil and natural gas, is typically handled through a system of pipelines that transport collected fluids containing the hydrocarbon fluids from the mouth of each well, to a production facility. At the production facility, the collected fluids are processed in order to separate the oil, gas, water and solid sediment, and to prepare the various fluids for export and/or storage.

The collection pipelines from each well in the field are interconnected at a wellhead containing an array of valves. The valves control the flow of collected fluids to a general production line for the process of separation and measurement of the total flow, and, selectively, to a measurement line which deviates the production of each well separately for periodic measurement of the parameters that indicate the operating conditions at each well. These parameters can then be utilized in determining the optimal manner in which to operate each well to maximize production. Typically, such measurement is performed well-by-well such that the flow of fluid from a single well is diverted for measurement while the flow of fluid from all other wells in the oil field are kept aligned towards the head of production.

In both flows (the flow to the measurement head and the flow to the production head), instruments are positioned to measure the pressures and volumes of oil, gas and water handled. The instruments may include pressure gauges, orifice plates and/or other basic measuring instruments known in the art. With existing systems, the valves in the wellhead are controlled manually by personnel at the production facility, in order to divert and route the flow of collected fluid from each well, as desired. After separation, oil is pumped to a central storage station, for the appropriate storage and/or recompression, as needed.

As will be readily appreciated, and even in the case where multiple wells are obtaining fluid from the same underground reservoir, the flow and pressure of each individual well and associated pipeline is dependent upon a variety of factors. For example, alterations in the downhole vicinity of each individual well, as well as any repairs made to each well space, may affect the flow and pressure of a well. In addition, the diameter of the pipelines carrying the collected fluid, which may decrease over time due to the buildup of limescale deposits or other products formed during the production phase of the well, as well as friction losses along the different lengths of discharge lines of each well, may also affect the flow and pressure of each well. As a result, the pressures on arrival at the wellhead may be different for each well, despite being potentially sourced from the same reservoir.

As will be appreciated, wells exhibiting a higher pressure at the wellhead tend to limit or impede the contribution of wells exhibiting lower pressures. That is, the flow of wells exhibiting higher pressures arriving at the wellhead generates a backpressure against the lower pressure wells, thus impeding the flow of the lower-pressure wells and lowering their associated production.

Particularly in mature fields or fields exhibiting rapidly declining production, such backpressures can cause significant disparities in the production rates of each individual well. These disparities often go unrecognized, however, because production of the wellhead is typically viewed as a whole. In any event, the overall production levels for the field suffers because lower pressure wells typically will have much lower production rates than would be possible if the undesirable backpressures were absent or significantly reduced.

Accordingly, there is a need for a system and method to reduce or optimize backpressures between different wells within an oil/natural gas field, to enhance the production levels of the individual wells and, thus, the field as a whole.

SUMMARY OF THE INVENTION

It is an object of the present invention to provide a system and method for enhancing the production of resource wells, in general, and oil and gas fields, specifically.

It is another object of the present invention to provide a system and method for enhancing the production of oil and gas wells by optimizing the backpressures between different wells.

It is another object of the present invention to provide a system and method for enhancing the production of oil and gas wells by optimizing/balancing the backpressures between different wells prior to processing.

It is another object of the present invention to provide a system for enhancing the production of oil and gas wells that can be easily and quickly installed and operated.

It is another object of the present invention to provide a system for enhancing the production of oil and gas wells that is capable of automatically measuring various parameters and conditions within the wells, on a real time basis.

It is another object of the present invention to provide a system for enhancing the production of oil and gas wells that is configured to individually measure the production of each well connected to the system.

It is another object of the present invention to provide a system for enhancing the production of oil and gas wells that is configured to measure the aggregate output of all of the wells connected to the system.

It is another object of the present invention to provide a system for enhancing the production of oil and gas wells by identifying in real time the pressure regimen of two or more wells operating within a discrete pressure range and to allocate such wells to a single, dedicated wellhead/manifold (and thereafter, through a mechanical multiphase pump for transporting the whole product of all such connected wells), thus minimizing the effects of undesirable backpressure between wells operating at differing pressures.

These and other objects, features, and advantages of the present invention will become apparent in light of the detailed description of the best mode embodiment thereof, as illustrated in the accompanying drawings.

BRIEF DESCRIPTION OF THE DRAWINGS

The present invention will be better understood from reading the following description of non-limiting embodiments, with reference to the attached drawings, wherein below.

Other features and advantages of the present invention will become apparent from the following detailed description, taken in conjunction with the accompanying drawings, which illustrate, by way of example, the principals of the invention.

DETAILED DESCRIPTION OF THE PREFERRED EMBODIMENTS

Figure 1:
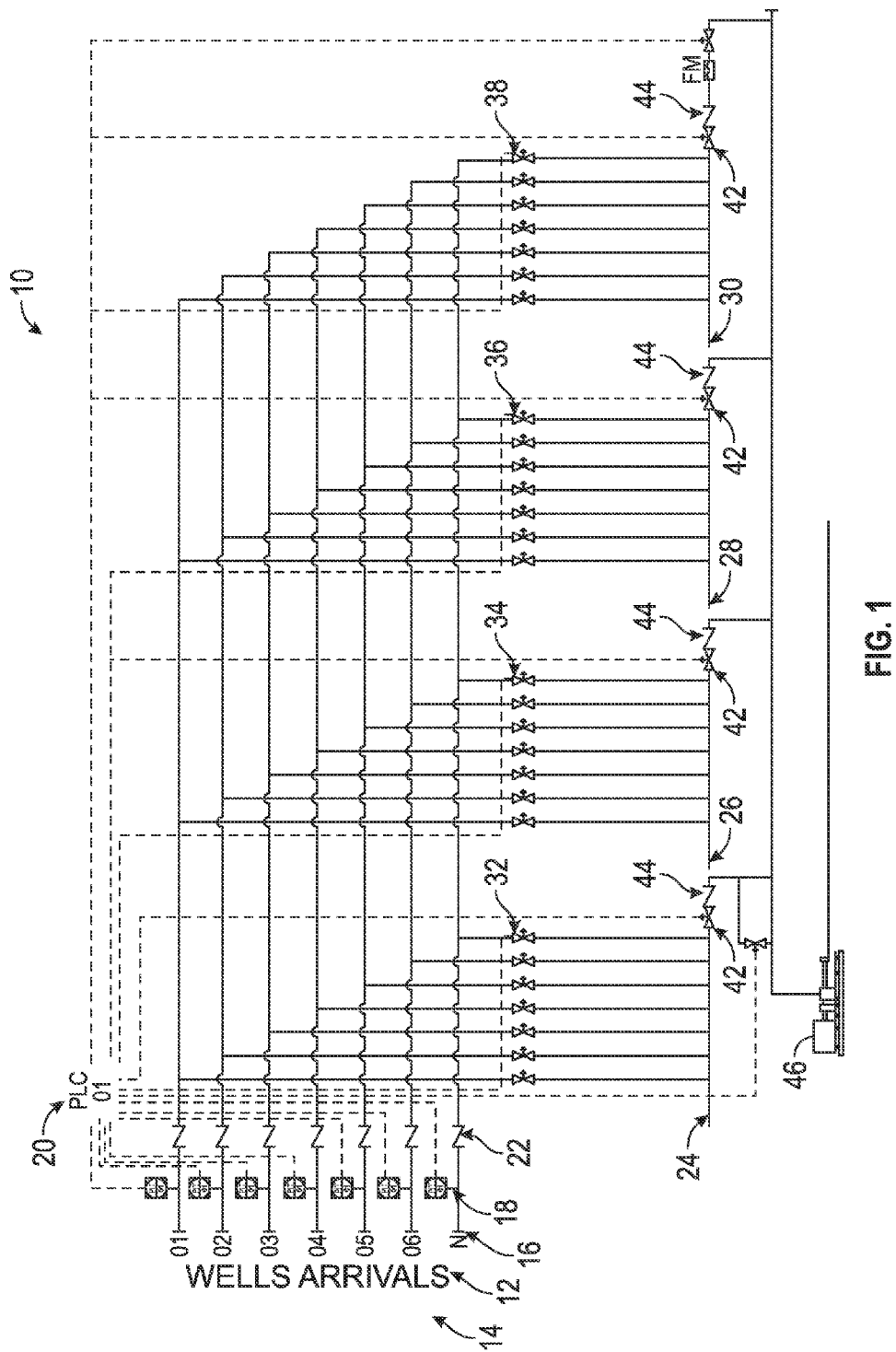
FIG. 1 is a schematic diagram of a system for enhancing the production of oil and gas wells according to an embodiment of the present invention.
Figure 2:
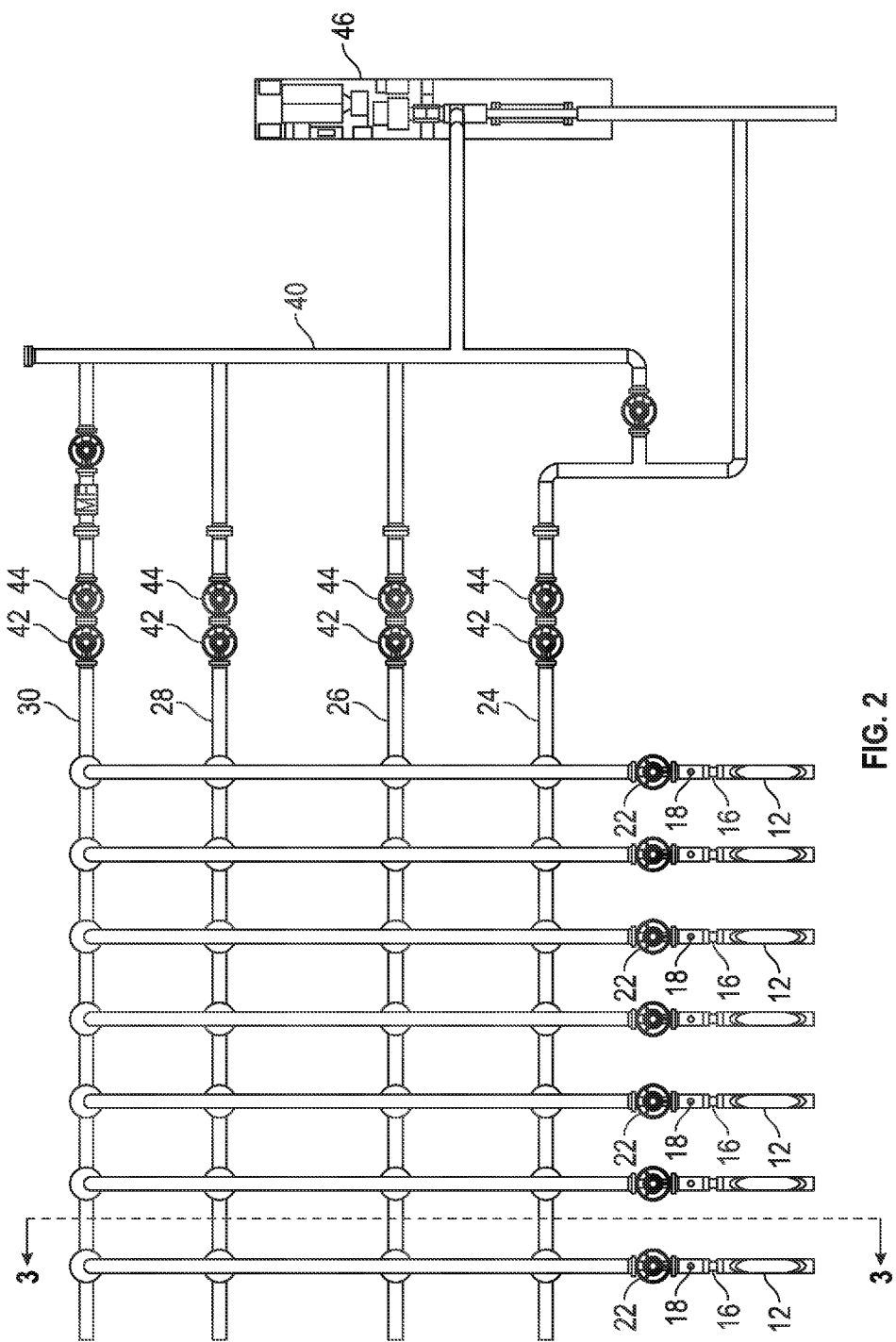
FIG. 2 is a detail, schematic diagram of a portion of the system of FIG. 1.
Figure 3:
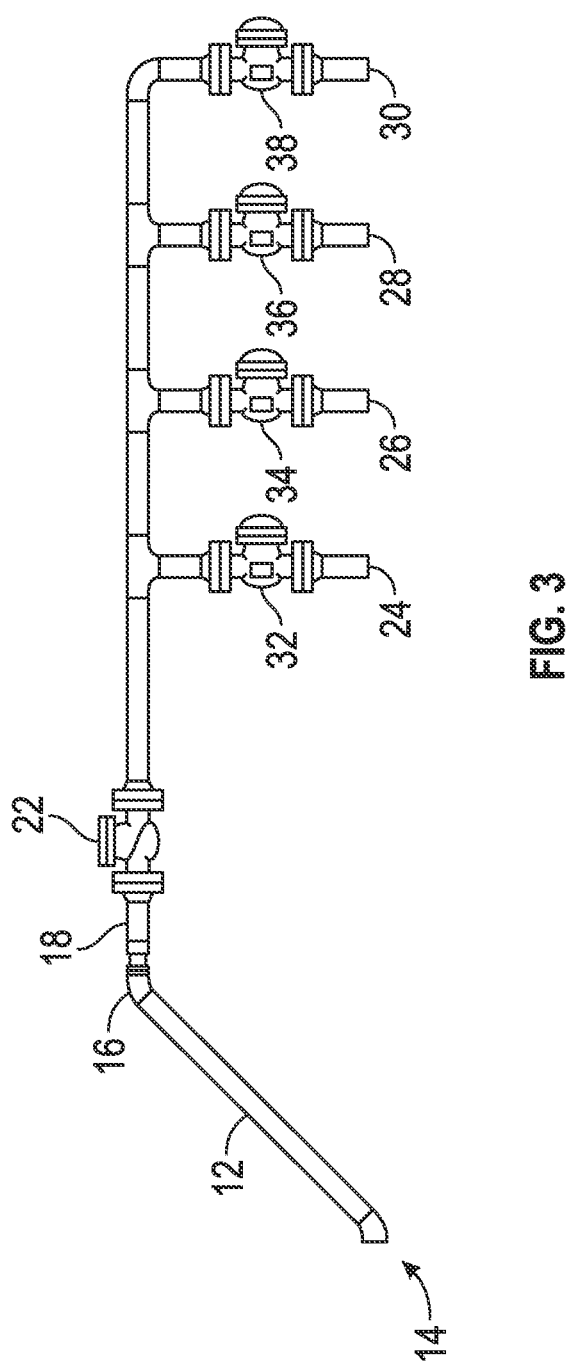
FIG. 3 is a cross-sectional view of a portion of the system of FIG. 1, taken along line A-A of FIG. 2.
Figure 4:
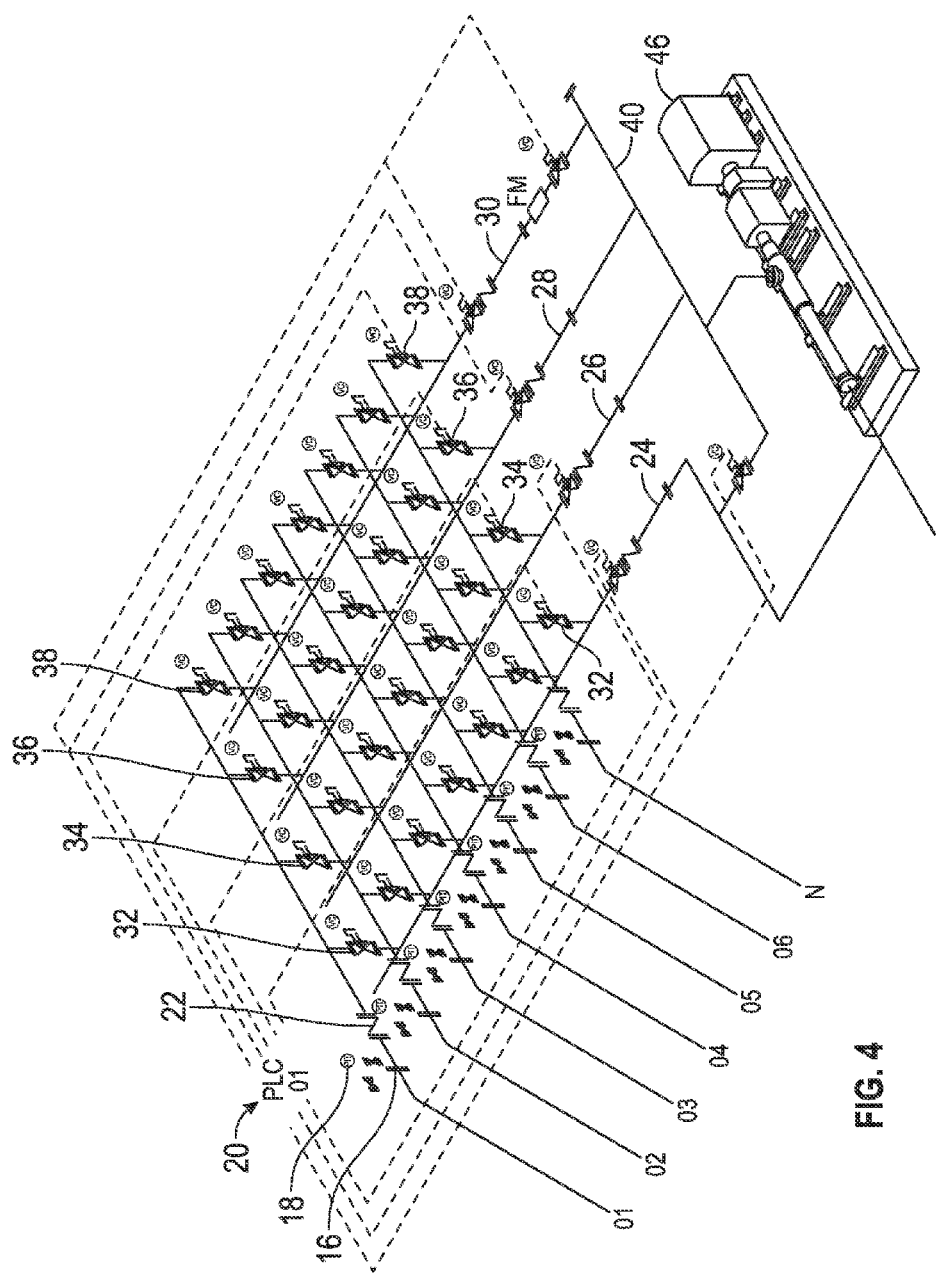
FIG. 4 is a perspective view of the system of FIG. 1.

Referring to FIGS. 1-4, a system 10 for enhancing the production level of wells that are extracting fluid from a resource field, e.g., oil and gas wells, is shown. The system 10 includes a plurality of pipelines 12 arriving from the oil/gas wells 14 in an oil field/underground fluid reservoir. The arrival pipelines 12 are in fluid communication with a plurality of wellheads 24, 28, 26 and 30, and serve to supply the system 10 with a flow of extracted fluid. The extracted fluid is typically a mixture of oil, natural gas, water and solid sediment, and it will be readily appreciated that the present invention is equally applicable to extracted fluids and particulates of any type or composition. As best shown in FIGS. 1 and 4, the system 10 includes a variable number of arrival pipelines 12, which may or may not be extracting fluid from the same underground fluid reservoir.

As shown in FIG. 1, each arrival pipeline 12 is connected to the system 10 through a connection 16, such as a fast or quick-connection, as is known in the art. Downstream from the connection 16, each pipeline is configured with a differential pressure sensor/transmitter 18. In the preferred embodiment, the differential pressure sensor/transmitter 18 is calibrated according to the pressure ranges to be handled for each line. Each pressure sensor/transmitter 18 is configured to detect the pressure on each of the respective pipelines 12 at predetermined intervals of time, and relay the detected pressure to a control unit 20, preferably envisioned as a Programmable Logic Controller (PLC). As will be appreciated, the pressure in each line may be interrogated by its dedicated pressure sensor/transmitter 18 at any desired periodic rate, such as but not limited to an interrogation every second, with a matching relay of this information to the PLC control unit 20.

A check valve 22 is also positioned along each line and ensures one-way flow of fluid, i.e. a flow in the direction away from the well 14 and towards pressure and metering heads, as discussed hereinafter.

As best shown in FIG. 1, the arrival pipelines 12 from each well 14 are preferably coupled to a "high pressure" wellhead 24, a "low pressure" wellhead 28, an "intermediate pressure" wellhead 26 and a metering wellhead 30, via known "T" junctions or the like. That is, each well in the drilling field extracts fluid from the field via the individual pipelines 12, and each of these pipelines 12 are themselves operatively and fluidly connected by additional pipelines to each of the wellheads 24, 28, 26 and 30, as best shown in FIGS. 1 and 4.

As utilized herein, the term 'wellhead' should not be interpreted as describing a particular structure or assembly, but as will be appreciated by one of ordinary skill in the art, is generally applicable to any structure or assembly, including but not limited to various enclosures, manifolds, pipelines or other structures, that are themselves capable of accepting the flow from one or more pipelines emanating from one or more resource fields.

Returning now to FIGS. 1 and 4, the flow of extracted fluid from each of the arrival pipelines 12 to the high pressure head 24 is controlled through the selective actuation of high pressure head control valves 32, under direction of the control unit 20. Likewise, the flow of extracted fluids from each of the arrival pipelines 12 to the intermediate pressure head 26 is controlled through the selective actuation of intermediate pressure head control valves 34, just as flow to the low pressure head 28 and the metering head 30 is similarly controlled through the selective actuation of low pressure head control valves 36 and metering head control valves 38, respectively, all under the direction of the control unit 20.

For its part, FIG. 3 generally illustrates a single arrival pipeline 12 and the T-junctions leading to the high, low, intermediate and metering heads/pipelines 24, 28, 26 and 30.

Notably, the control valves 32, 34, 36, 38 which are integrated in each T-junction are electrically coupled to the control unit 20. The control unit 20 is configured to control operation of the control valves 32, 34, 36, 38 to selectively control and alternatively permit or deny the flow of extracted fluid in each of the pipelines 12, to one of the high, low, intermediate and metering heads 24, 26, 28, 30, as discussed in detail below. In particular, the control unit 20 determines when and for how long each of the valves 32, 34, 36, 38 are open and, therefore, determines how long the valves allow passage of the extracted fluid to each of the heads 24, 26, 28, 30. Similarly, the control unit 20 controls the closing of the valves 32, 34, 36, 38 to selectively prevent the flow of fluid to one or more of the heads 24, 26, 28, 30.

As will now be readily appreciated, by providing each individual pipeline 12 with the ability to be selectively diverted to separate wellheads, via operation of the control unit 20, it is therefore possible to actively and selectively choose the destination of the extracted fluid flowing in each of the individual pipelines 12.

It is therefore an important aspect of the present invention that by creating such a selective segmentation of the flow in each of the pipelines 12 to one of the high, low and intermediate pressure lines/heads, it is possible to, e.g., group and direct all those pipelines 12 operating at 'low' pressures, to the low pressure wellhead 28. Likewise, all those pipelines 12 operating at an 'intermediate' pressure can be selectively grouped and directed towards the intermediate pressure wellhead 26, while all of the wells and associated pipelines 12 that are operating at 'high' pressures can be equally grouped and directed to the high pressure wellhead 24, or metering wellhead 30, as desired.

As will be appreciated, the terms 'low', intermediate' and 'high' do not themselves designate a set or absolute pressure, or range of pressures, of operation, but rather are merely relative terms. Thus, the actual pressures in each of the wellheads 24, 26, 28 and 30 represent a differing range of pressures which may be considered 'low', 'intermediate', or 'high' only insofar as they relate to one another. In this regard, each of the wellheads 24, 26, 28 and 30 will enjoy a range of pressures which has an amplitude that is established by the control unit 20, operating according to a set of instructions and its own internal algorithms and guidelines.

By way of example, if there exists 40 wells and associated pipelines extracting fluid from a particular resource field (or, multiple fields), the control unit 20 is capable of diverting, e.g., the 10 lowest-pressure pipelines 12 to the 'low' pressure wellhead 28, while correspondingly indentifying and thereafter diverting the flow from the next 10 pipelines (operating at a range of pressures some point above that of the first 10 pipelines), to the 'intermediate' wellhead 26. And assuming that the remaining 20 pipelines 12 are all operating at a range of pressures above even that of the 'intermediate' pipelines 12, these 20 pipelines 12 can themselves be selectively directed to the 'high' pressure wellhead 24.

In such a fashion, and regardless of the number of actual wells in any given resource field, or plurality of fields, and independent of the actual range of pressures that each pipeline 12 in the field or fields is currently operating within, the system of the present invention can determine and thereafter divert each individual well and associated pipeline 12 to an appropriate wellhead so as to ensure that none of the pipelines 12 experience undue backpressure which would otherwise affect and reduce the production of each individual well.

In connection with the above, the control unit 20 employs a dedicated and proprietary control algorithm to identify the pressure in each of the pipelines 12, via data provided by sensors 18. Next, the range of operating pressures of each of the high pressure head 24, intermediate pressure head 26 and low pressure head 28 are determined by the control unit 20. In particular, the respective ranges of operating pressures for each head 24, 26, 28 are determined utilizing an algorithm that takes into account the minimum, maximum and average pressure readings in the arrival pipelines 12. In a preferred embodiment of the present invention, the control unit 20 is configured to dynamically update the operating pressure ranges in each wellhead, in real-time, in dependence upon varying conditions and pressure readings at the respective wells 14 and pipelines 12.

It is therefore another important aspect of the present invention that the system 10 is capable of analyzing the pressures detected in each arrival pipeline 12, in real-time and on a periodic basis selected by the algorithm and control unit 20, to thereby determine the appropriate pressure ranges for each head 24, 26, 28. The control unit 20 can thereafter divert those pipelines 12 falling into each of these determined ranges to the appropriate wellhead, all in dependence upon the local conditions in each individual well 14 and pipeline 12, thereby optimizing fluid flow from the resource field as a whole.

Indeed, by dynamically adjusting the pressure ranges for each head 24, 26, 28 in dependence upon detected pressures within each well, and by selectively controlling the flow of fluid from each well 14 to one of the heads 24, 26 or 28 in dependence thereof, the existence of excessive backpressure can be effectively reduced or eliminated causing a corresponding increase in the production level of each well in the resource field or fields, regardless of the variance in pressures that each well is currently experiencing.

As explained, once the operating pressure ranges for each head 24, 26, 28 have been established, the necessary instructions to control operation of the valves 32, 34, 36, 38 are generated by the control unit 20. Each of the valves 32, 34, 36, 38 is then controlled to direct the flow of fluid from each well 14/pipeline 12 to one of the high pressure head 26, intermediate pressure head 26 or low pressure head 28, as appropriate. In particular, the control unit 20 controls the flow of fluid from each arrival pipeline 12 to the head 26, 28, 30 best suited to handle the pressure in each arrival pipeline 12 so as to minimize backpressure within each line.

The system of the present invention is therefore capable of isolating high pressure wells/pipelines from the flow of fluid in lower pressure wells/pipelines, thereby minimizing backpressure within these lower pressure arrival lines which would normally inhibit the production from such lower pressure wells. As a result, production from lower pressure wells, as well as for the resource field or fields as a whole, is increased.

In a preferred embodiment, the control unit 20 is configured to perform data warehousing which may be utilized by the control unit 20 to perform dynamic optimization of operating pressure ranges for the heads 24, 26, 28. The control unit 20 may also include, or otherwise access, a database (not show) for storing detected pressures within the arrival lines 12, for real time or later analysis and use in calculating optimum operating pressure ranges.

As again best shown in FIGS. 1 and 4, an outlet of each of the high, low and intermediate pressure lines/heads 24, 26, 28 (as well as metering head 30) is fluidly coupled to a suction pipeline 40 in which the fluid from the high, low and intermediate pressure heads 24, 26, 28 is combined. A gate valve 42 and check valve 44 positioned adjacent to the outlet of each head controls a flow of fluid therefrom and into the finish pipeline 40. As also shown therein, one or more multiphase pumps, such as a progressive cavity pump 46, functions to incorporate the three fluid flows, particularly flows from the intermediate and low pressure lines/heads 26 and 28, and possibly the high pressure line/head 24, as desired, into the suction pipeline 40 and to pump the extracted fluid downstream for separation and further processing by the finish pipeline of pump discharge, as is known in the art. The operation of the multiphase pump 46 is preferably under the direction of the control unit 20.

As noted previously, existing systems typically combine the flows from all of the arrival pipelines at a single head or location, thus exposing lower pressure wells/pipelines to the increased pressure of the higher-pressure wells/pipelines. As a result, the higher-pressure wells tend to produce backpressures in the lower pressure lines which negatively affect the production of such lower pressure wells.

In contrast to these known systems, it is another important aspect of the present invention that the system 10 is configured to operate automatically, without the need for manual handling of equipment and/or instruments. In connection with this, the system 10 is configured to monitor well/arrival pipeline pressures continuously or at predetermined time intervals, via sensors 18 and the like, and adjust the effective operating pressure ranges of each head, in real-time, by selectively directing one or more pipelines to each head, in dependence upon the detected pressures in each well/pipeline. Thus, wells/pipelines of like-pressures will be efficiently grouped together and directed towards one of a plurality of heads, all without need for manual monitoring or alteration, so as to increase production and profitability of the resource filed as a whole.

While the system 10 of the present invention has been described herein in connection with the extraction of hydrocarbons, such as oil and natural gas, the present invention is not so limited in this regard. In particular, the system 10 of the present invention is applicable to the extraction of hydrocarbons, specifically, as well as being equally applicable to the extraction of any ground-based fluid resource, more generally.

Still further, while the system 10 has been described as defining heads having three differing pressure regimens (i.e., low, intermediate and high), the present invention is not so limited in this regard. Thus, there may be a fewer, or greater, number of heads utilized by the system 10, and defined by the control unit 20, in dependence upon the parameters of the particular resource field and the perceived economy of the additional structure needed for each head, without departing from the broader aspects of the present invention.

It should also be noted that the control unit 20, and its operating algorithm, may accept vastly more inputs than simply the data received and communicated by the sensors 18, without departing from the broader aspects of the present invention. Thus, any number of environmental or technical datum may be detected, determined or otherwise provided to the control unit 20 for use in actively controlling the operation of the system 10, including but not limited to temperature and relevant equipment data, without departing from the broader aspects of the present invention. Likewise, the communication of data to the control unit 20 may be effectuated via electronic means, wired or wireless, or via any other manner, as appropriate. As all relevant data is communicated to the control unit 20, it will also be readily appreciated that the data and resultant control of the system 10 may be accomplished on site, or to a far remote location, as desired.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A control system for optimizing the flow of fluid from a plurality of pipelines, said plurality of pipelines being in communication with a resource field, said control system comprising:

a sensor array, said sensor array detecting an operational and environmental characteristic of one or more of said resource field, said plurality of pipelines and said flow of fluid through said plurality of pipelines;

a plurality of manifold assemblies for selectively receiving said flow of fluid from said plurality of pipelines, each of said plurality of manifolds operating within discrete and different pressure ranges;

a controller in communication with said sensor array, said plurality of pipelines and said plurality of manifold assemblies; and wherein said controller selectively diverts said flow of said fluid from a first group of said plurality of pipelines to one of said plurality of manifold assemblies, while diverting said flow of said fluid from a second group of said plurality of pipelines to another of said plurality of manifold assemblies, all in dependence upon said operational and environmental characteristic communicated to said controller;

wherein said operational and environmental characteristic detected by said sensor array is a pressure in each of said plurality of pipelines;

wherein said controller selects said first group from said plurality of said pipelines so as to be within a first pressure range of said detected pressures;

wherein said controller selects said second group from said plurality of said pipelines so as to be within a second pressure range of said detected pressures, said first pressure range and said second pressure range being different from one another; and wherein said controller selectively alters said first pressure range and said second pressure range, as well as selectively altering which of said plurality of pipelines are selected for said first group and said second group, in dependence upon a real-time detection of said pressure in each of said plurality of pipelines.

2. The control system for optimizing the flow of fluid from a plurality of pipelines according to claim 1, further comprising:

a pump in fluid communication with each of said manifold assemblies, said pump selectively diverting one or more of said flows from said manifold assemblies to a suction pipeline, under control of said controller.

3. The control system for optimizing the flow of fluid from a plurality of pipelines according to claim 1, wherein:

said controller makes said selective alterations of said first and said second pressure ranges, and said first and said second groups, by virtue of an integrated control algorithm, said integrated control algorithm utilizing one or more of said real-time operational and environmental characteristic communicated to said controller.

4. The control system for optimizing the flow of fluid from a plurality of pipelines according to claim 1, wherein:

said controller makes said selective alterations of said first and said second pressure ranges, and said first and said second groups, by virtue of a control algorithm, said control algorithm utilizing said real-time detection of said pressure in each of said plurality of pipelines.

5. The control system for optimizing the flow of fluid from a plurality of pipelines according to claim 1, wherein:

said controller selectively diverts said flow of fluid in said plurality of pipelines by controlling valve assemblies associated with each of said plurality of pipelines.

6. A method of optimizing the flow of fluid from a plurality of pipelines by reducing negative effects of backpressure on said plurality of pipelines, said plurality of pipelines being in communication with a resource field, said method comprising the steps of:

forming a sensor array, said sensor array detecting an operational and environmental characteristic of one or more of said resource field, said plurality of pipelines and said flow of fluid through said plurality of pipelines;

arranging a plurality of manifold assemblies for selectively receiving said flow of fluid from said plurality of pipelines, each of said manifold assemblies having a different operational pressure range from one another;

forming a controller to be in communication with said sensor array, said plurality of pipelines and said plurality of manifold assemblies;

operating said controller to selectively divert said flow of said fluid from a first group of said plurality of pipelines to one of said plurality of manifold assemblies, while diverting said flow of said fluid from a second group of said plurality of pipelines to another of said plurality of manifold assemblies, all in dependence upon said operational and environmental characteristic communicated to said controller, in order to reduce said negative effects of said backpressure on said first and said second groups of said plurality of pipelines;

designating a pressure in each of said plurality of pipelines to be one of said operational characteristics detected by said sensor array;

operating said controller to select said first group from said plurality of said pipelines so as to be within a first pressure range of said detected pressures;

operating said controller to select said second group from said plurality of said pipelines so as to be within a second pressure range of said detected pressures, said first pressure range and said second pressure range being different from one another; and operating said controller to selectively alter said first pressure range and said second pressure range, as well as selectively altering which of said plurality of pipelines are selected for said first group and said second group, in dependence upon a real-time detection of said operational and environmental characteristics communicated to said controller.

7. The method of optimizing the flow of fluid from a plurality of pipelines according to claim 6, further comprising the steps of:

arranging a pump to be in fluid communication with each of said manifold assemblies, said pump selectively diverting one or more of said flows from said manifold assemblies to a suction pipeline, under control of said controller.

8. The method of optimizing the flow of fluid from a plurality of pipelines according to claim 6, further comprising the steps of:

operating said controller to make said selective alterations of said first and said second pressure ranges, and said first and said second groups, by virtue of an integrated control algorithm, said integrated control algorithm utilizing one or more of said real-time operational and environmental characteristics communicated to said controller.

9. The method of optimizing the flow of fluid from a plurality of pipelines according to claim 6, further comprising the steps of:

operating said controller to selectively divert said flow of fluid in said plurality of pipelines by controlling valve assemblies associated with each of said plurality of pipelines.

10. The method of optimizing the flow of fluid from a plurality of pipelines by reducing negative effects of backpressure on said plurality of pipelines, said plurality of pipelines being in communication with a resource field, said method comprising the steps of:

forming a sensor array, said sensor array detecting an operational and environmental characteristic of one or more of said resource field, said plurality of pipelines and said flow of fluid through said plurality of pipelines;

arranging a plurality of manifold assemblies for selectively receiving said flow of fluid from said plurality of pipelines, each of said manifold assemblies having a different operational pressure range from one another;

forming a controller to be in communication with said sensor array, said plurality of pipelines and said plurality of manifold assemblies;

operating said controller to selectively divert said flow of said fluid from a first group of said plurality of pipelines to one of said plurality of manifold assemblies, while diverting said flow of said fluid from a second group of said plurality of pipelines to another of said plurality of manifold assemblies, all in dependence upon said operational and environmental characteristic communicated to said controller, in order to reduce said negative effects of said backpressure on said first and said second groups of said plurality of pipelines;

designating a pressure in each of said plurality of pipelines to be one of said operational characteristics detected by said sensor array;

operating said controller to select said first group from said plurality of said pipelines so as to be within a first pressure range of said detected pressures;

operating said controller to select said second group from said plurality of said pipelines so as to be within a second pressure range of said detected pressures, said first pressure range and said second pressure range being different from one another; and operating said controller to selectively alter said first pressure range and said second pressure range, as well as selectively altering which of said plurality of pipelines are selected for said first group and said second group, in dependence upon a real-time detection of said pressure in each of said plurality of pipelines.

11. The method of optimizing the flow of fluid from a plurality of pipelines according to claim 10, further comprising the steps of:

operating said controller to make said selective alterations of said first and said second pressure ranges, and said first and said second groups, by virtue of an integrated control algorithm, said integrated control algorithm utilizing said real-time detection of said pressure in each of said plurality of pipelines.

12. A method of optimizing the flow of fluid from a first pipeline and a second pipeline, said first and said second pipelines being in communication with a resource field, said method comprising the steps of:

arranging a sensor array so as to detect a first pressure of said fluid in said first pipeline and a second pressure of said fluid in said second pipeline;

forming a first wellhead manifold to selectively receive said flow of fluid from said first and said second pipelines;

forming a second wellhead manifold to selectively receive said flow of fluid from said first and said second pipelines;

arranging a controller to be in communication with said sensor array and said first and said second pipelines;

selectively diverting said flow of said fluid from said first and said second pipelines to one of said first and said second manifolds solely in dependence upon said first and said second detected pressures being communicated to said controller;

operating said controller in accordance with an integrated control algorithm;

utilizing said control algorithm to set a first pressure range of said first wellhead manifold and a second pressure range of said second wellhead manifold, said first and said second pressure ranges being different from one another; and operating said control algorithm to alter said first pressure range and said second pressure range in dependence upon said detected pressures being communicated to said controller in real-time.

13. The method of optimizing the flow of fluid from a first pipeline and a second pipeline according to claim 12, said method further comprising the steps of:

arranging a pump to be in fluid communication with each of said first and said second manifold assemblies, said pump selectively diverting one or more of said flows from said first and said second manifold assemblies to a suction pipeline, under direction of said controller.

14. A control system for optimizing the flow of fluid from a plurality of pipelines, said plurality of pipelines being in communication with a resource field, said control system comprising:
   a sensor array, said sensor array detecting characteristics of one or more of said resource field, said plurality of pipelines, and said flow of said fluid through said plurality of pipelines;
   a first manifold assembly selectively receiving said flow of fluid from any of said plurality of pipelines;
   a second manifold assembly selectively receiving said flow of fluid from any of said plurality of pipelines, said first manifold assembly and said second manifold assembly operating within different pressure ranges;
   a controller in communication with said sensor array, said first manifold assembly and said second manifold assembly;
   wherein said controller selectively diverts said flow of said fluid from a first group of said plurality of pipelines to one of said first and said second manifold assemblies, and diverts a second group of said plurality of pipelines to another of said first and said second manifold assemblies, in dependence upon said characteristics being communicated to said controller
   wherein said controller includes an integrated control algorithm, said control algorithm defining a first pressure range for said first manifold assembly and a second pressure range for said second manifold assembly, in dependence upon said real-time pressure within each of said plurality of pipelines; and
   wherein said first pressure range is different from said second pressure range;
   wherein said control algorithm selectively alters said first pressure range and said second pressure range, in real-time, in dependence upon a change in said real-time pressure within each of said plurality of pipelines; and
   said controller selectively alters which of said plurality of pipelines are in said first group of said plurality of pipelines, and selectively alters which of said plurality of pipelines are in said second group of said plurality of pipelines, in dependence upon a change in said real-time pressure within each of said plurality of pipelines.

15. The control system for optimizing the flow of fluid from a plurality of pipelines according to claim 14, a further comprising:
   a pump in fluid communication with each of said first and said second manifold assemblies, said pump selectively diverting one or more of said flows from said first and said second manifold assemblies to a suction pipeline, under direction of said controller.

16. The control system for optimizing the flow of fluid from a plurality of pipelines according to claim 14, wherein:
   one of said detected characteristics is a real-time pressure within each of said plurality of pipelines.

17. A control system for optimizing the flow of fluid from a plurality of pipelines, said plurality of pipelines being in communication with a resource field, said control system comprising:
   a sensor array, said sensor array detecting an operational and environmental characteristic of one or more of said resource field, said plurality of pipelines and said flow of fluid through said plurality of pipelines;
   a plurality of manifold assemblies for selectively receiving said flow of fluid from said plurality of pipelines;
   a controller in communication with said sensor array, said plurality of pipelines and said plurality of manifold assemblies;
   wherein said controller selectively diverts said flow of said fluid from a first group of said plurality of pipelines to one of said plurality of manifold assemblies, while diverting said flow of said fluid from a second group of said plurality of pipelines to another of said plurality of manifold assemblies, all in dependence upon said operational and environmental characteristic communicated to said controller;
   wherein said operational and environmental characteristic detected by said sensor array is a pressure in each of said plurality of pipelines;
   wherein said controller selects said first group from said plurality of said pipelines so as to be within a first pressure range of said detected pressures; and
   said controller selects said second group from said plurality of said pipelines so as to be within a second pressure range of said detected pressures, said first pressure range and said second pressure range being different from one another; and
   wherein said controller selectively alters said first pressure range and said second pressure range, as well as selectively altering which of said plurality of pipelines are selected for said first group and said second group, in dependence upon a real-time detection of said operational and environmental characteristic communicated to said controller.

* * * * *